United States Patent
Tomes

(10) Patent No.: US 12,522,370 B2
(45) Date of Patent: Jan. 13, 2026

(54) ROTORCRAFT POWERPLANT COOLING SYSTEM

(71) Applicant: Pratt & Whitney Canada Corp., Longueuil (CA)

(72) Inventor: Nathan Tomes, Hamilton (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/417,011

(22) Filed: Jan. 19, 2024

(65) Prior Publication Data

US 2025/0236407 A1    Jul. 24, 2025

(51) Int. Cl.
B64C 27/82    (2006.01)
B64D 33/08    (2006.01)

(52) U.S. Cl.
CPC .............. B64D 33/08 (2013.01); B64C 27/82 (2013.01)

(58) Field of Classification Search
CPC ................................ B64D 27/82; B64D 33/08
See application file for complete search history.

(56) References Cited

U.S. PATENT DOCUMENTS

| | | | | |
|---|---|---|---|---|
| 4,830,312 A | * | 5/1989 | Hain ...................... | B64D 33/08 244/17.11 |
| 6,134,879 A | | 10/2000 | Frawley | |
| 10,118,695 B2 | * | 11/2018 | Thomassin ............. | B64C 27/82 |
| 10,273,018 B2 | * | 4/2019 | Pantalone, III ........ | B64D 33/04 |
| 11,613,350 B1 | | 3/2023 | Bodla | |
| 2012/0318910 A1 | * | 12/2012 | Smith ..................... | B64C 27/82 244/52 |
| 2013/0119186 A1 | * | 5/2013 | Heid ....................... | B64C 27/82 244/17.21 |
| 2014/0090820 A1 | * | 4/2014 | Pisani ..................... | B64C 27/12 165/121 |
| 2016/0115864 A1 | | 4/2016 | Campbell | |
| 2016/0207618 A1 | | 7/2016 | Darrow, Jr. | |
| 2017/0267341 A1 | | 9/2017 | Thomassin | |
| 2022/0169374 A1 | * | 6/2022 | Landry .................... | B64C 5/06 |
| 2022/0285753 A1 | * | 9/2022 | Rainville ............. | B64C 29/0033 |

FOREIGN PATENT DOCUMENTS

CN    106428581 B    8/2018
EP    4173963 B1    5/2024

OTHER PUBLICATIONS

"File: Notar System.svg", Wikimedia Commons, https://commons.wikimedia.org/wiki/File:NOTAR_System.svg, Sep. 14, 2007.
EP Search Report for EP Patent Application No. 25152941.8 dated Mar. 17, 2025.

* cited by examiner

Primary Examiner — Michael H Wang
(74) Attorney, Agent, or Firm — Getz Balich LLC

(57) ABSTRACT

An assembly is provided for a rotorcraft. This rotorcraft assembly includes a fuselage, a tail boom, an air system and a cooling system. The tail boom projects longitudinally along a centerline out from the fuselage. The air system includes an air flowpath. The air flowpath passes from the fuselage into the tail boom and extends longitudinally within the tail boom. The cooling system includes a first heat exchanger and a coolant flowpath extending through the first heat exchanger. The first heat exchanger is arranged with the tail boom. The first heat exchanger is configured to transfer heat energy between system air flowing in the air flowpath and coolant flowing in the coolant flowpath.

20 Claims, 10 Drawing Sheets

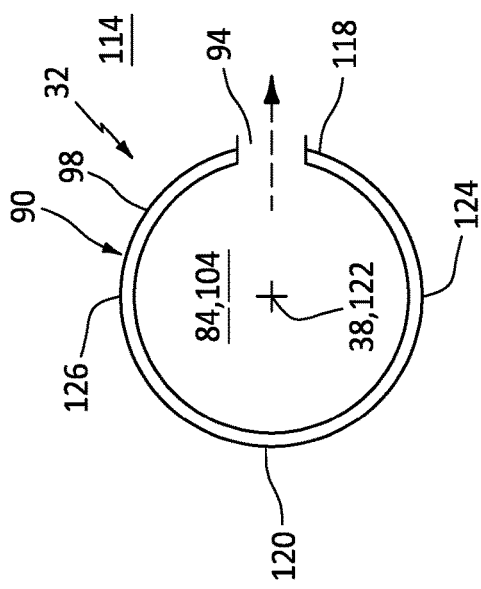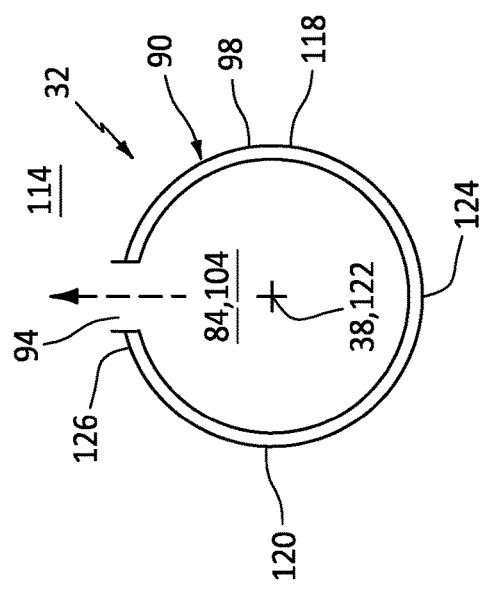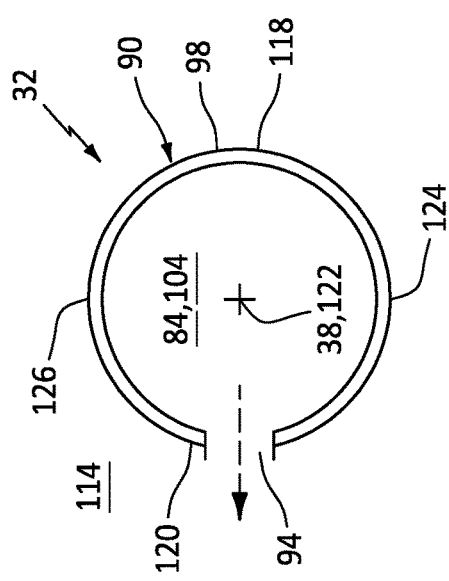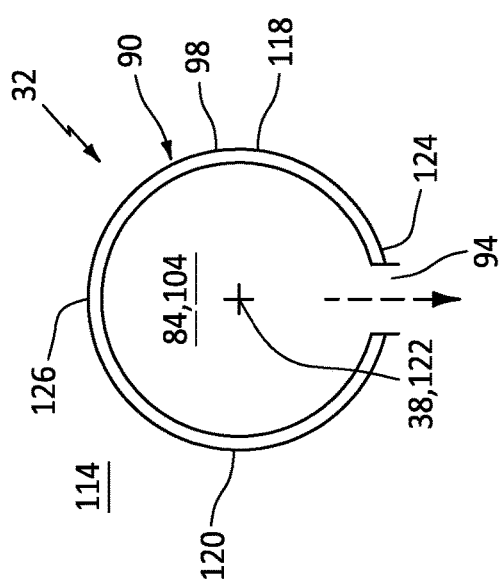

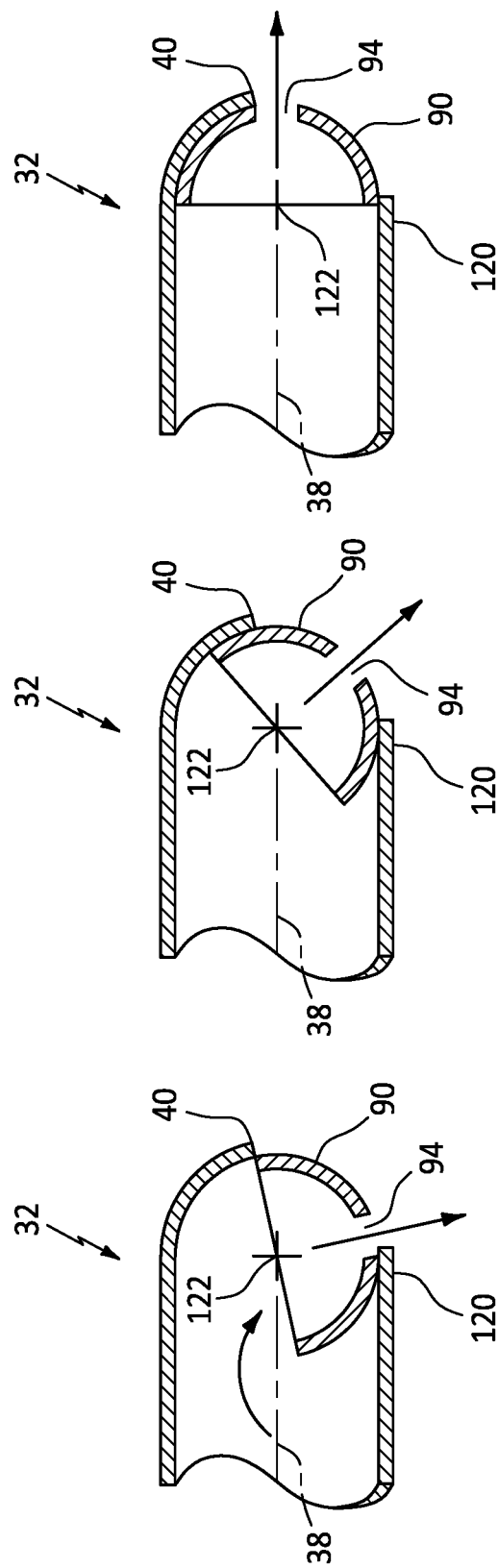

ROTORCRAFT POWERPLANT COOLING SYSTEM

TECHNICAL FIELD

This disclosure relates generally to a rotorcraft and, more particularly, to a cooling system for the rotorcraft.

BACKGROUND INFORMATION

A rotorcraft may include a cooling system for cooling its powerplant. Various types and configurations of powerplant cooling systems for a rotorcraft are known in the art. While these known cooling systems have various benefits, there is still room in the art for improvement.

SUMMARY

According to an aspect of the present disclosure, an assembly is provided for a rotorcraft. This rotorcraft assembly includes a fuselage, a tail boom, an air system and a cooling system. The tail boom projects longitudinally along a centerline out from the fuselage. The air system includes an air flowpath. The air flowpath passes from the fuselage into the tail boom and extends longitudinally within the tail boom. The cooling system includes a first heat exchanger and a coolant flowpath extending through the first heat exchanger. The first heat exchanger is arranged with the tail boom. The first heat exchanger is configured to transfer heat energy between system air flowing in the air flowpath and coolant flowing in the coolant flowpath.

According to another aspect of the present disclosure, another assembly is provided for a rotorcraft. This rotorcraft assembly includes a fuselage, a tail boom, a powerplant and a cooling system. The tail boom projects longitudinally along a centerline out from the fuselage. The powerplant includes a heat engine arranged in the fuselage. The cooling system includes a first heat exchanger and a coolant flowpath. The first heat exchanger is disposed in the tail boom. The coolant flowpath extends through the heat engine and the first heat exchanger.

According to still another aspect of the present disclosure, a rotorcraft is provided configured without a tail rotor. This rotorcraft includes a fuselage, a tail boom, a rotorcraft rotor, a powerplant and a heat exchange system for the powerplant. The tail boom is connected to and projects out from the fuselage. The rotorcraft rotor is above the fuselage. The powerplant is configured to drive rotation of the rotorcraft rotor. The powerplant includes a heat engine within the fuselage. The heat exchange system includes a heat exchanger in the tail boom.

The rotorcraft assembly may also include an air system which includes an air flowpath. The air flowpath may pass from the fuselage into the tail boom and extend longitudinally within the tail boom. The first heat exchanger may be configured to transfer heat energy from liquid coolant flowing in the coolant flowpath into system air flowing in the air flowpath.

The first heat exchanger may be configured to transfer heat energy between ambient air outside of the tail boom and liquid coolant flowing in the coolant flowpath.

The first heat exchanger may include a plurality of internal passages and a plurality of cooling elements. The internal passages may form a section of the coolant flowpath within the first heat exchanger. Each of the cooling elements may project into the air flowpath.

The first heat exchanger may extend circumferentially about the air flowpath and the centerline.

The first heat exchanger may be disposed in the air flowpath.

The first heat exchanger may form an outer peripheral side of the air flowpath.

The first heat exchanger may be configured to transfer additional heat energy between ambient air outside of the tail boom and the coolant flowing in the coolant flowpath.

The first heat exchanger may be integrated into a structure of the tail boom.

The tail boom may include an exterior surface. The first heat exchanger may form a portion of the exterior surface.

The air system may be configured as an anti-torque system for the rotorcraft.

The tail boom may include a sidewall and a slot. The sidewall may extend longitudinally along the centerline and circumferentially around the air flowpath. The slot may extend longitudinally in the sidewall. The slot may project through the sidewall to fluidly couple the air flowpath to an environment external to the tail boom.

The tail boom may project longitudinally along the centerline out from the fuselage to a distal tail end of the tail boom. The air flowpath may extend longitudinally within the tail boom to an outlet located at the distal tail end of the tail boom.

The tail boom may include a variable tail thruster arranged at the distal tail end of the tail boom. The variable tail thruster may include the outlet and may be rotatable about an axis.

The tail boom may be configured without a rotorcraft tail rotor.

The rotorcraft assembly may also include a powerplant which includes a heat engine. The cooling system may be configured to receive the heat energy from the heat engine. The first heat exchanger may be configured to transfer the heat energy out of the coolant flowing in the coolant flowpath and into the system air flowing in the air flowpath.

The rotorcraft assembly may also include a second heat exchanger arranged upstream of the first heat exchanger along the air flowpath. The powerplant may also include a powerplant flowpath extending through the second heat exchanger and the heat engine.

The heat engine may be configured as or otherwise include a rotary engine.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIGS. 5A-D are schematic cross-sectional illustrations of a variable tail thruster in various thrust positions.

FIGS. 10A-C are schematic sectional illustrations of another variable tail thruster in various thrust positions.

DETAILED DESCRIPTION

Figure 1:
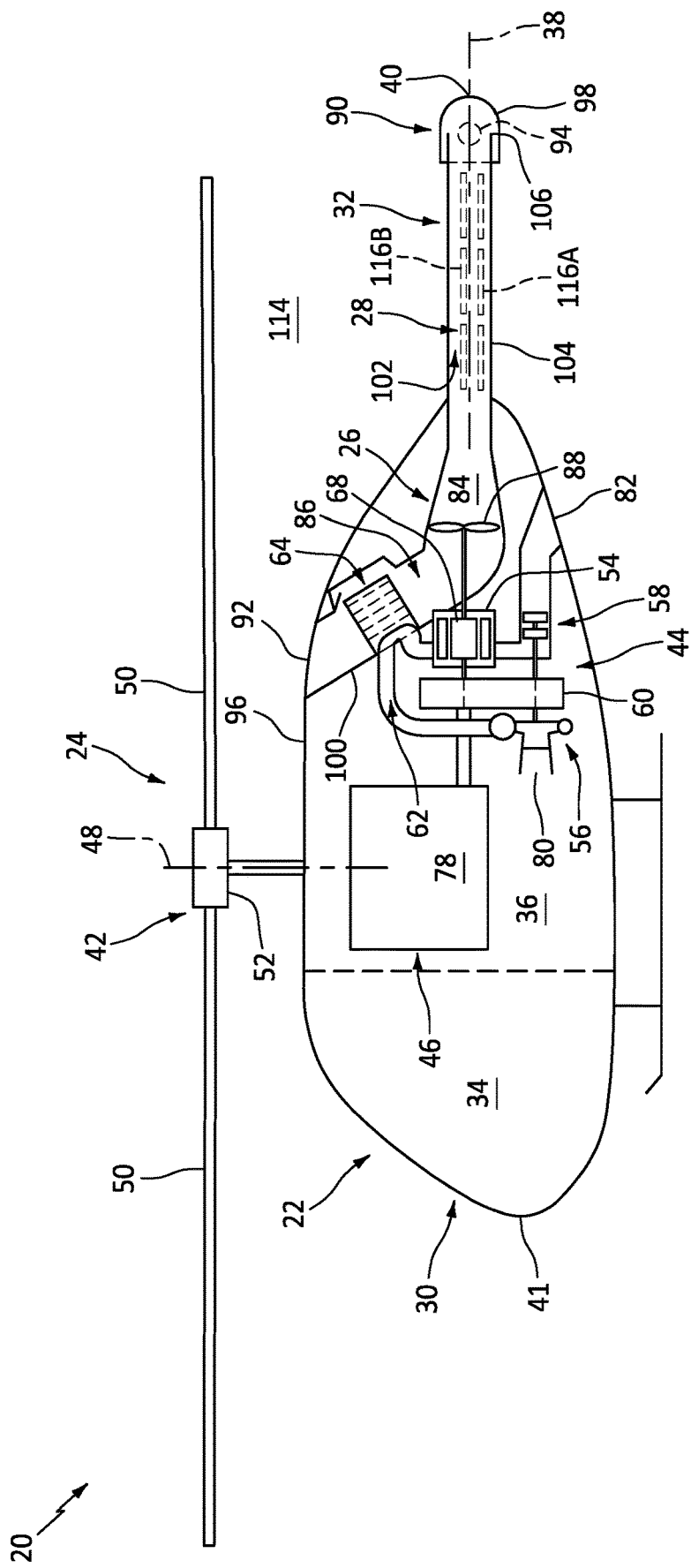
FIG. 1 is a schematic illustration of a rotorcraft.

FIG. 1 illustrates a rotorcraft 20 such as a helicopter or a drone; e.g., an unmanned aerial vehicle. This rotorcraft 20 may be configured as a tail rotor-less rotorcraft; e.g., a rotorcraft configured without an anti-torque tail rotor such as a NOTAR® ("no tail rotor") helicopter. The rotorcraft 20 of FIG. 1, for example, includes a rotorcraft airframe 22, a rotorcraft lift system 24, a rotorcraft air system 26 and a rotorcraft cooling system 28; e.g., a powerplant cooling system. As described below in further detail, the air system 26 of FIG. 1 is configured as a no tail rotor anti-torque system (e.g., a Coanda effect anti-torque system) which replaces a traditional anti-torque tail rotor.

The airframe 22 of FIG. 1 includes a rotorcraft fuselage 30 and a rotorcraft tail boom 32. The fuselage 30 of FIG. 1 includes one or more internal compartments such as a personnel cabin 34 (e.g., a cockpit, a passenger cabin, etc.) and a separate mechanical compartment 36 (e.g., an engine bay, etc.). The tail boom 32 is connected to (e.g., attached to and cantilevered from) the fuselage 30 at an aft end of the fuselage 30. This tail boom 32 projects longitudinally out from the fuselage 30 along a longitudinal centerline 38 of the tail boom 32 to a distal tail end 40 of the tail boom 32. Here, the boom tail end 40 is an aftmost end of the airframe 22 and, more generally, an aftmost end of the rotorcraft 20. A horizontally opposing nose end 41 of the fuselage 30 is a forwardmost end of the airframe 22.

The lift system 24 of FIG. 1 includes a bladed rotorcraft rotor 42 (e.g., an air mover such as a main helicopter rotor), a rotorcraft powerplant 44 and a drivetrain 46. The rotorcraft rotor 42 is rotatable about a rotational axis 48, which rotational axis 48 of FIG. 1 is angularly offset from the centerline 38 by an included offset angle. This offset angle may be between eighty degrees (80°) and one-hundred degrees (100°); e.g., about ninety degrees (90°). The rotorcraft rotor 42 of FIG. 1 includes a plurality of rotor blades 50 and a rotor base 52; e.g., a hub or a disk. The rotor blades 50 are arranged circumferentially about the rotor base 52 and the rotational axis 48 in an array. Each of the rotor blades 50 is connected to and projects radially out from (relative to the rotational axis 48) the rotor base 52. The rotorcraft rotor 42 of FIG. 1 is located vertically above the fuselage 30. Moreover, the rotorcraft rotor 42 is spaced vertically out from the fuselage 30 and, more generally, the airframe 22. Here, the rotorcraft rotor 42 is an unshrouded rotor. The present disclosure, however, is not limited to such an exemplary rotorcraft rotor location or configuration.

Figure 2:
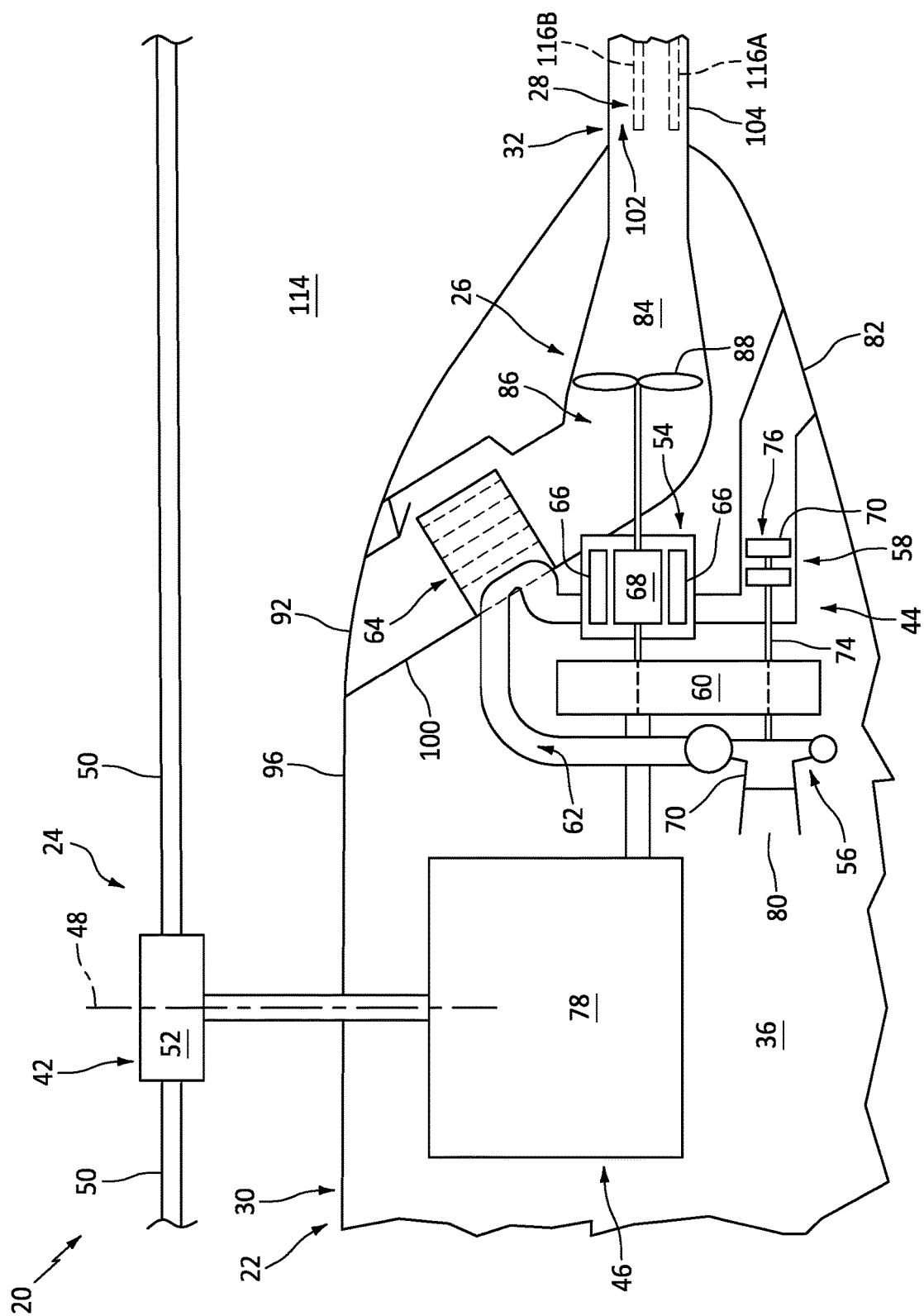
FIG. 2 is a partial schematic illustration of the rotorcraft at its powerplant.

Referring to FIG. 2, the rotorcraft powerplant 44 may be configured as or otherwise include a turbo-compounded engine system. The rotorcraft powerplant 44 of FIG. 2, for example, includes a heat engine 54, a compressor section 56, a turbine section 58 and a transmission 60; e.g., a gear system, a speed change device and/or a variable speed transmission. The rotorcraft powerplant 44 of FIG. 2 also includes a powerplant flowpath 62 (e.g., a core flowpath) and a powerplant heat exchanger 64.

The heat engine 54 of FIG. 2 is an intermittent combustion internal combustion (IC) engine. Examples of this intermittent combustion internal combustion engine include, but not limited to, a rotary engine (e.g., a Wankel cycle engine) and a reciprocating piston engine (e.g., an inline (I) engine, a V-engine or a W-engine). However, for ease of description, the heat engine 54 may be generally described below as the rotary engine. The heat engine 54 of FIG. 2 is configured to detonate (e.g., combust) a mixture of fuel and air within one or more combustion zones 66. Each combustion zone 66 may be configured as or otherwise include a combustion chamber (or a piston bore and/or the like) within the heat engine 54. The detonation of the fuel-air mixture within the combustion zones 66 drives rotation of an internal engine rotating assembly 68 of the heat engine 54. This engine rotating assembly 68 may include one or more rotors (or pistons) in and/or along the combustion zones 66, and is rotatable about an engine axis.

The compressor section 56 includes a bladed compressor rotor 70. This compressor rotor 70 may be configured as a radial flow compressor rotor; e.g., an axial inflow-radial outflow compressor rotor, a centrifugal compressor rotor, a compressor impeller, etc. Alternatively, the compressor rotor 70 may be configured as an axial flow compressor rotor; e.g., an axial inflow-axial outflow compressor rotor. The compressor rotor 70 of FIG. 2 includes a compressor rotor base (e.g., a disk or a hub) and a plurality of compressor rotor blades (e.g., airfoils, vanes, etc.). The compressor rotor blades are arranged circumferentially around the compressor rotor base in an array. Each of the compressor rotor blades is connected to and projects radially out from the compressor rotor base. The compressor rotor 70 is rotatable about a compressor axis.

The turbine section 58 includes a bladed turbine rotor 72. This turbine rotor 72 may be configured as an axial flow turbine rotor; e.g., an axial inflow-axial outflow turbine rotor. Alternatively, the turbine rotor 72 may be configured as a radial flow turbine rotor; e.g., a radial inflow-axial outflow turbine rotor, a centrifugal turbine rotor, a turbine wheel, etc. The turbine rotor 72 of FIG. 2 includes a turbine rotor base (e.g., a disk or a hub) and a plurality of turbine rotor blades (e.g., airfoils, vanes, etc.). The turbine rotor blades are arranged circumferentially around the turbine rotor base in an array. Each of the turbine rotor blades is connected to and projects radially out from the turbine rotor base. The turbine rotor 72 is rotatable about a turbine axis, which turbine axis may be parallel (e.g., coaxial) with the compressor axis.

The turbine rotor 72 may be coupled to the compressor rotor 70 directly through a turbo-compressor shaft 74 or indirectly through the transmission 60. At least (or only) the compressor rotor 70, the turbine rotor 72 and the turbo-compressor shaft 74 may collectively form a turbo-compressor rotating assembly 76; e.g., a spool. This turbo-compressor rotating assembly 76 and its turbine rotor 72 are operatively coupled to and rotatable with the engine rotating assembly 68 through the transmission 60. The turbo-compressor rotating assembly 76 may thereby rotate at a different rotational velocity than the engine rotating assembly 68. The engine rotating assembly 68 is also operatively coupled to and rotatable with the rotorcraft rotor 42 through the drivetrain 46, and the transmission 60 in the exemplary arrangement of FIG. 2. The drivetrain 46 of FIG. 2 includes a geartrain 78 (e.g., a speed change device, a variable speed transmission, etc.) operatively coupling the engine rotating assembly 68/the transmission 60 to the rotorcraft rotor 42.

The engine rotating assembly 68 may thereby rotate at a different rotational velocity than the rotorcraft rotor 42.

The powerplant flowpath 62 extends between an airflow inlet 80 into the powerplant flowpath 62 and a combustion products exhaust 82 from the powerplant flowpath 62. The flowpath inlet 80 may also be an airflow inlet into the rotorcraft powerplant 44. The flowpath exhaust 82 may also be a combustion products exhaust from the rotorcraft powerplant 44. Within the rotorcraft powerplant 44, the powerplant flowpath 62 of FIG. 2 extends (e.g., sequentially) through the compressor section 56 (e.g., across the compressor rotor 70), the powerplant heat exchanger 64, the heat engine 54 (e.g., along/across the rotors (or pistons) of the engine rotating assembly 68) and the turbine section 58 (e.g., across the turbine rotor 72) from the flowpath inlet 80 to the flowpath exhaust 82.

During operation of the rotorcraft powerplant 44, fuel is injected into the combustion zones 66. The fuel is mixed with compressed air within the combustion zones 66. This fuel-air mixture is ignited, and combustion products generated therefrom drive rotation of the engine rotating assembly 68. The rotation of the engine rotating assembly 68 drives rotation of the rotorcraft rotor 42 through the drivetrain 46, and the rotating rotorcraft rotor 42 generates aircraft lift (and aircraft thrust). The combustion products further flow out of the heat engine 54 into the turbine section 58 and drive rotation of the turbine rotor 72. The rotation of the turbine rotor 72 drives rotation of the compressor rotor 70, and the rotating compressor rotor 70 compresses air entering the rotorcraft powerplant 44 and its powerplant flowpath 62 through the flowpath inlet 80 to provide the compressed air to the heat engine 54. The rotation of the turbine rotor 72 also drives rotation of (e.g., boosts mechanical power to) the engine rotating assembly 68 through the transmission 60. The rotation of the turbine rotor 72 may thereby also drive rotation of (e.g., boost mechanical power to) the rotorcraft rotor 42 through the transmission 60 and the drivetrain 46.

The powerplant heat exchanger 64 may be configured as an intercooler for the rotorcraft powerplant 44. This powerplant heat exchanger 64 is arranged with an air flowpath 84 of the air system 26. The powerplant heat exchanger 64 of FIG. 2, for example, is disposed within an upstream section 86 of the air flowpath 84 extending in the fuselage 30. With this arrangement, the powerplant heat exchanger 64 is configured to transfer heat energy from (A) the relatively warm compressed air directed through the powerplant flowpath 62 from the compressor section 56 towards the heat engine 54 into (B) relatively cool air system air ("system air") directed through the air flowpath 84 as described below in further detail. The powerplant heat exchanger 64 may thereby cool the compressed air for delivery to the heat engine 54. This pre-cooling of the compressed air delivered to the heat engine 54 may facilitate increased heat engine efficiency.

As indicated above, the air system 26 of FIG. 1 is configured as a no tail rotor anti-torque system which replaces a traditional anti-torque tail rotor. This air system 26 includes the air flowpath 84 and an air mover 88. The air system 26 of FIG. 1 also includes a variable tail thruster 90, which variable tail thruster 90 is configured as a part of the tail boom 32 at its boom tail end 40.

The air flowpath 84 extends within the airframe 22 between an airflow inlet 92 into the air flowpath 84 and an airflow outlet 94 (e.g., a nozzle outlet) from the air flowpath 84. The flowpath inlet 92 may be arranged with the fuselage 30. The flowpath inlet 92 of FIG. 1, for example, is formed in an exterior wall 96 of the fuselage 30 at a top side of the fuselage 30 and vertically beneath the rotorcraft rotor 42. Of course, various other flowpath inlet 92 locations are feasible and contemplated by the present disclosure. The flowpath outlet 94 is arranged with the tail boom 32. The flowpath outlet 94 of FIG. 1, for example, is formed in an exterior wall 98 of the variable tail thruster 90 at (e.g., on, adjacent or proximate) the boom tail end 40; see also FIGS. 5A-C.

The upstream section 86 of the air flowpath 84 is formed within the fuselage 30. The upstream section 86 of the air flowpath 84, for example, may be at least partially (or completely) formed by an air duct 100 disposed within the fuselage 30. This air duct 100 may extend from (and form) the flowpath inlet 92 to a downstream section 102 of the air flowpath 84.

The downstream section 102 of the air flowpath 84 is formed within the tail boom 32. The downstream section 102 of the air flowpath 84, for example, may be at least partially (or completely) formed by a boom sidewall 104 of the tail boom 32 and the variable tail thruster 90.

Figure 3:
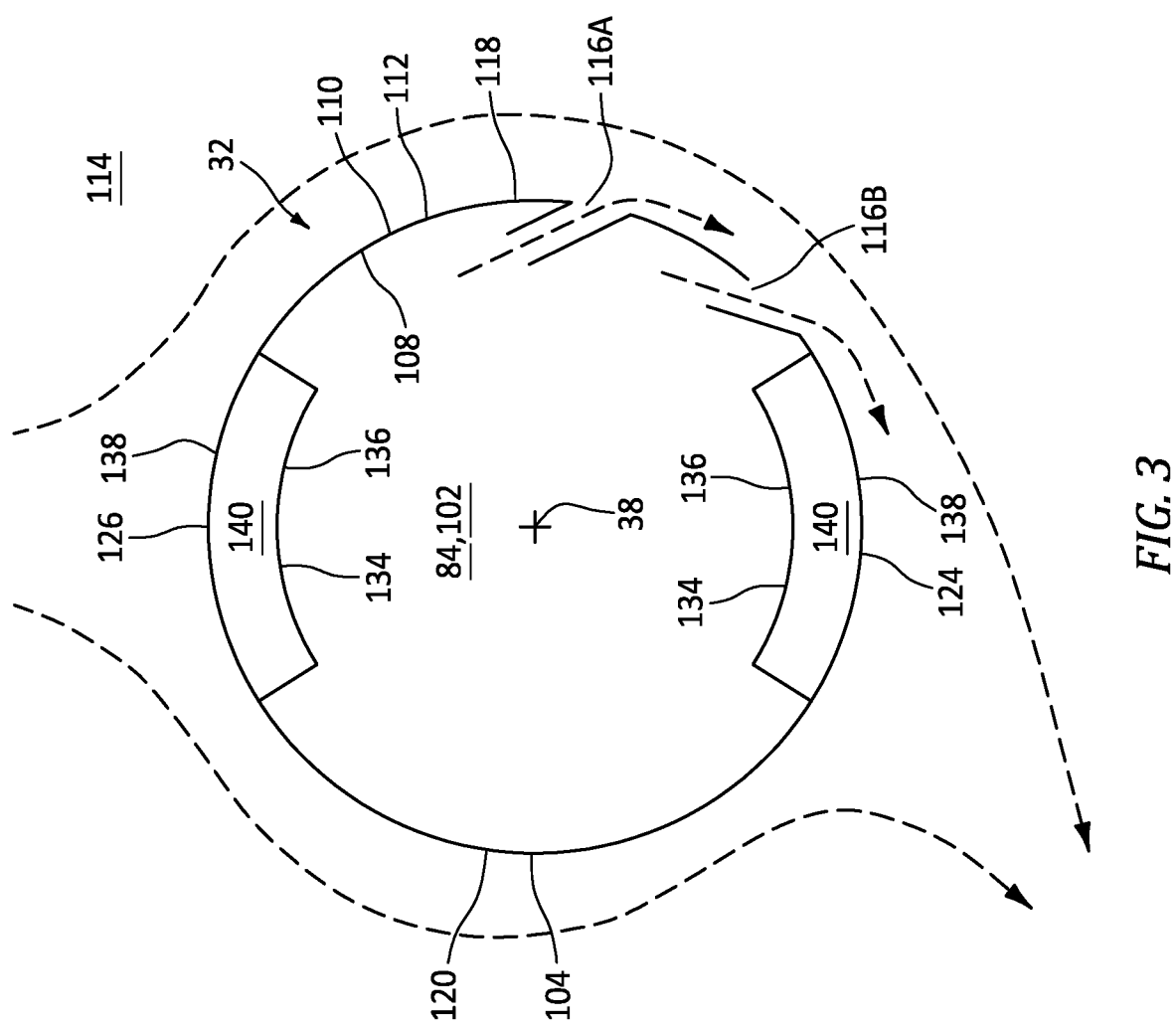
FIG. 3 is a schematic cross-sectional illustration of a tail boom of the rotorcraft taken along section line 3-3 in FIG. 4.

The boom sidewall 104 projects longitudinally along the centerline 38 out from the fuselage 30 to a longitudinal distal end 106 of the boom sidewall 104 proximate the boom tail end 40. Referring to FIG. 3, the boom sidewall 104 extends radially (relative to the centerline 38) between a radial inner side 108 of the boom sidewall 104 and a radial outer side 110 of the boom sidewall 104. The sidewall inner side 108 may at least partially (or completely) form a radial outer peripheral boundary of the air flowpath 84 within the boom sidewall 104; e.g., from the fuselage 30 to the variable tail thruster 90 of FIG. 1. The sidewall outer side 110 may form an exterior surface 112 of the boom sidewall 104 exposed to an environment 114 external to the tail boom 32 and, more generally, the rotorcraft 20 of FIG. 1. The boom sidewall 104 of FIG. 3 extends circumferentially about (e.g., completely around) the centerline 38 providing the boom sidewall 104 with a full-hoop (e.g., tubular) geometry.

Figure 4:
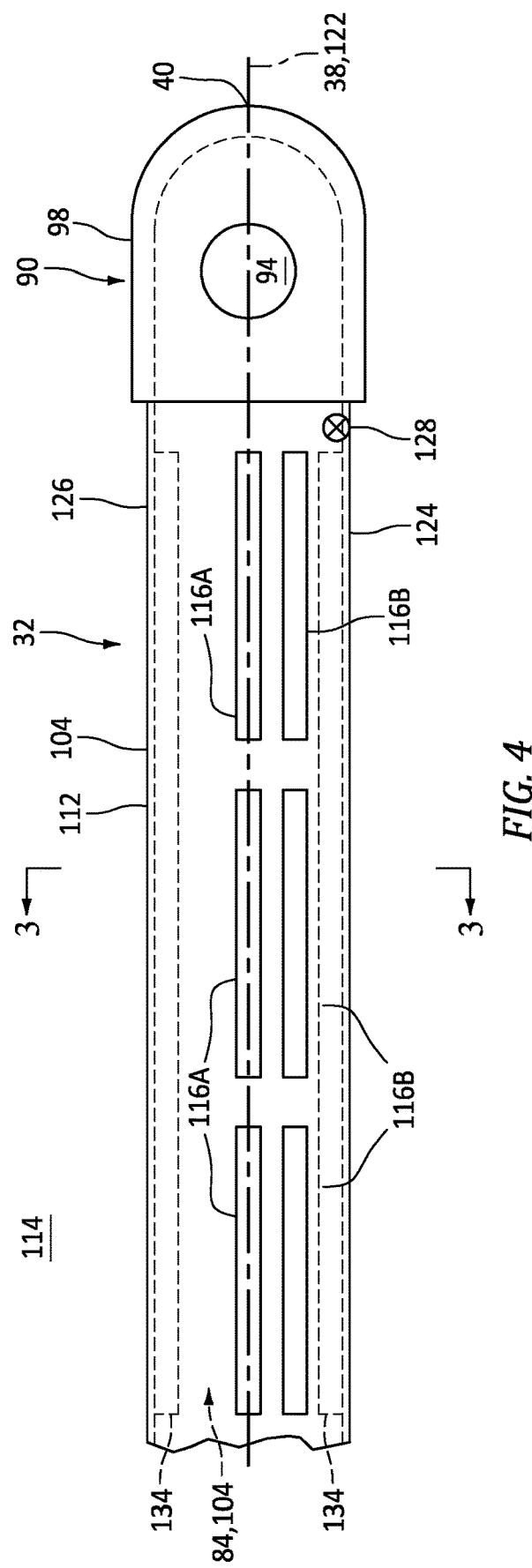
FIG. 4 is a side illustration of the tail boom depicted with various internal features in dashed line form.

Referring to FIG. 4, the boom sidewall 104 also includes one or more slots 116A and 116B (generally referred to as "116"). These slots 116 may be arranged into one or more longitudinally extending arrays, where the top array of slots 116A is located vertically above the bottom array of slots 116B circumferentially along the tail boom 32 and its boom sidewall 104. Referring to FIG. 1, each slot array may extend longitudinally along the tail boom 32 and its boom sidewall 104 from (or about) the fuselage 30 to (or about) a point generally aligned with an outer periphery of the rotorcraft rotor 42.

Each of the slots 116 of FIG. 4 extends longitudinally within the boom sidewall 104 along the centerline 38. Referring to FIG. 3, the slots 116 are disposed to a common (the same) first lateral side 118 of the tail boom 32 and its boom sidewall 104; e.g., a starboard side/right side. Thus, an opposing second lateral side 120 of the tail boom 32 and its boom sidewall 104 (e.g., a port side/left side) may be configured without any slots (or other similar apertures) fluidly coupling the air flowpath 84 to the external environment 114. Each of the slots 116 of FIG. 3 projects through the boom sidewall 104 along a trajectory of the respective slot 116 from the air flowpath 84 to the external environment 114. This slot trajectory may point generally vertically downward. Each slot trajectory may also be angularly offset from a reference plane tangent to the exterior surface 112 (e.g., at a point where the slot 116 pierces the exterior surface 112) by an included offset angle. This offset angle may be an acute angle between, for example, five degrees (5°) and thirty degrees (30°). With this arrangement, the slots 116 fluidly couple the air flowpath 84 to the external environment 114 and are operable to direct the system air out from the air flowpath 84 into the external environment 114 generally downward and along the exterior surface 112.

Referring to FIG. 4, the variable tail thruster 90 includes the flowpath outlet 94. This flowpath outlet 94 projects (e.g., radially) through the thruster wall 98 from the air flowpath 84 to the external environment 114. The variable tail thruster 90 is rotatably coupled to the boom sidewall 104 at the boom tail end 40. With this arrangement, referring to FIGS. 5A-D, the variable tail thruster 90 may rotate about a thruster axis 122 between various thrust positions. In the thrust position of FIG. 5A, the variable tail thruster 90 positions the flowpath outlet 94 to the second lateral side 120 of the tail boom 32. In the thrust position of FIG. 5B, the variable tail thruster 90 positions the flowpath outlet 94 to the first lateral side 118 of the tail boom 32. In the thrust position of FIG. 5C, the variable tail thruster 90 positions the flowpath outlet 94 to a vertical bottom side 124 of the tail boom 32. In the thrust position of FIG. 5D, the variable tail thruster 90 positions the flowpath outlet 94 to a vertical top side 126 of the tail boom 32.

Referring to FIG. 1, the air mover 88 is disposed within the air flowpath 84. The air mover 88 of FIG. 1 is located within the upstream section 86 of the air flowpath 84 downstream of the powerplant heat exchanger 64. The air mover 88, however, may alternatively be located within the upstream section 86 of the air flowpath 84 upstream of the powerplant heat exchanger 64. The air mover 88 may be configured as a fan rotor. The air mover 88 may be powered by the rotorcraft powerplant 44 and its heat engine 54 or another device (e.g., an electric motor).

During operation of the air system 26, ambient air flows into the air flowpath 84 through the flowpath inlet 92. This ambient air may be directed into the air flowpath 84 by thrust (e.g., main rotor wash, downwash) generated by the rotation of the rotorcraft rotor 42 and/or suction generated by rotation of the air mover 88. Within the air flowpath 84, the ambient air-now referred to as the system air-is directed through the powerplant heat exchanger 64 to cool the compressed air in the powerplant flowpath 62 as described above. The system air is subsequently directed by the air mover 88 into the downstream section 102 of the air flowpath 84 and the tail boom 32.

As the system air flows through the tail boom 32, a portion (e.g., about 30-70%) of the system air is exhausted from the air flowpath 84 into the external environment 114 through the slots 116. Referring to FIG. 3, this exhausted system air may interact with rotor wash from the rotorcraft rotor 42 to turn the rotor wash flowing around the tail boom 32 to the second lateral side 120 of the tail boom 32; e.g., where the rotorcraft rotor 42 is rotating counterclockwise when looking vertically down onto a vertical top of the rotorcraft 20 (see FIG. 1). By turning/redirecting the rotor wash towards the second lateral side 120 of the tail boom 32, the air system 26 is operable to utilize this redirected rotor wash to provide lateral thrust to counteract rotational torque imparted onto the airframe 22 by the rotation of the rotorcraft rotor 42. The air system 26 is thereby configured as an anti-rotation system for the rotorcraft.

Referring to FIG. 4, another portion (e.g., about 30-70%) of the system air is exhausted from the air flowpath 84 into the external environment 114 by the variable tail thruster 90 and through its flowpath outlet 94. Referring to FIGS. 5A and 5B, the variable tail thruster 90 may be rotated about the thruster axis 122 between its various thrust positions in order to control yaw of the rotorcraft. For example, to facilitate rotorcraft port-side yaw, the variable tail thruster 90 may be rotated to its thrust position of FIG. 5A. To facilitate rotorcraft starboard-side yaw, the variable tail thruster 90 may be rotated to its thrust position of FIG. 5B. Referring to FIGS. 5C and 5D, the variable tail thruster 90 may be rotated about the thruster axis 122 between its various thrust positions in order to control pitch of the rotorcraft. For example, to facilitate rotorcraft vertical downward pitch, the variable tail thruster 90 may be rotated to its thrust position of FIG. 5C. To facilitate rotorcraft vertical upward pitch, the variable tail thruster 90 may be rotated to its thrust position of FIG. 5D.

In some embodiments, referring to FIG. 4, the air system 26 may also include a flow regulator 128 (e.g., a valve, a vent, etc.) along the air flowpath 84. The flow regulator 128 of FIG. 4 is disposed longitudinally along the tail boom 32, for example downstream/aft of the slots 116 and upstream/forward of the flowpath outlet 94. This flow regulator 128 is configured to selectively exhaust (e.g., diffuse) the system air into the external environment 114. By selectively exhausting the system air, the flow regulator 128 is operable to tune operation of the variable tail thruster 90. For example, by opening or exhausting additional system air through the flow regulator 128, less of the system air is available to flow through the flowpath outlet 94 to generate thrust. However, by closing or exhausting less system air through the flow regulator 128, more of the system air is available to flow through the flowpath outlet 94 to generate thrust.

Figure 6:
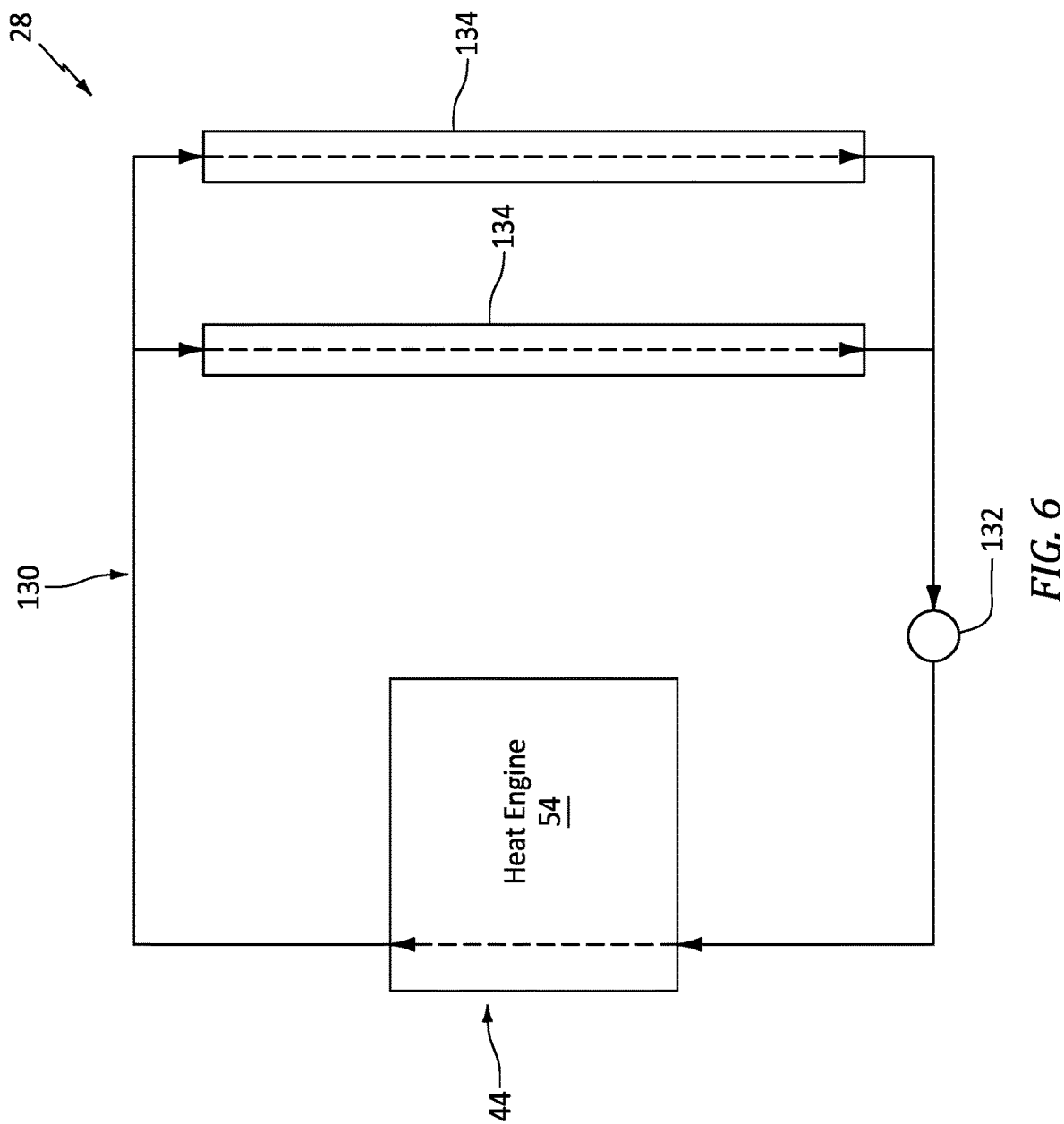
FIG. 6 is a schematic illustration of a cooling system for the rotorcraft.

Referring to FIG. 6, the cooling system 28 is a heat exchanger system which includes a coolant flowpath 130, a coolant flow regulator 132 (e.g., a pump and/or a valve system) and one or more cooling system heat exchangers 134; e.g., coolant coolers. The coolant flowpath 130 may form a closed loop cooling circuit. The coolant flowpath 130 of FIG. 6 extends through the heat exchangers 134 (e.g., in parallel) as well as through the rotorcraft powerplant 44 and its heat engine 54. The coolant flow regulator 132 is configured to circulate coolant (e.g., a liquid refrigerant, lubricant, etc.) within the coolant flowpath 130 and, thus, direct the coolant through the heat exchangers 134 and the heat engine 54. With this arrangement, the cooling system 28 is configured to cool the rotorcraft powerplant 44 and, more particularly, its heat engine 54. For example, as the coolant flows within/through the heat engine 54, heat energy may transfer from a structure (e.g., a casing) of the heat engine 54 and into the coolant. The coolant thereby cools the heat engine 54 while the heat engine 54 heats the coolant. The now heated coolant is subsequently directed to the heat exchangers 134 for cooling as described below in further detail.

Referring to FIGS. 3 and 4, the heat exchangers 134 are arranged with the tail boom 32. For example, referring to FIG. 3, each of the heat exchangers 134 may project partially radially into (or to) the air flowpath 84 from the boom sidewall 104. Each of the heat exchangers 134 may extend circumferentially (or otherwise widthwise) about the centerline 38 within (or about) the air flowpath 84. Referring to FIG. 4, each of the heat exchangers 134 may extend longitudinally along the air flowpath 84 and the centerline 38.

Figure 7:
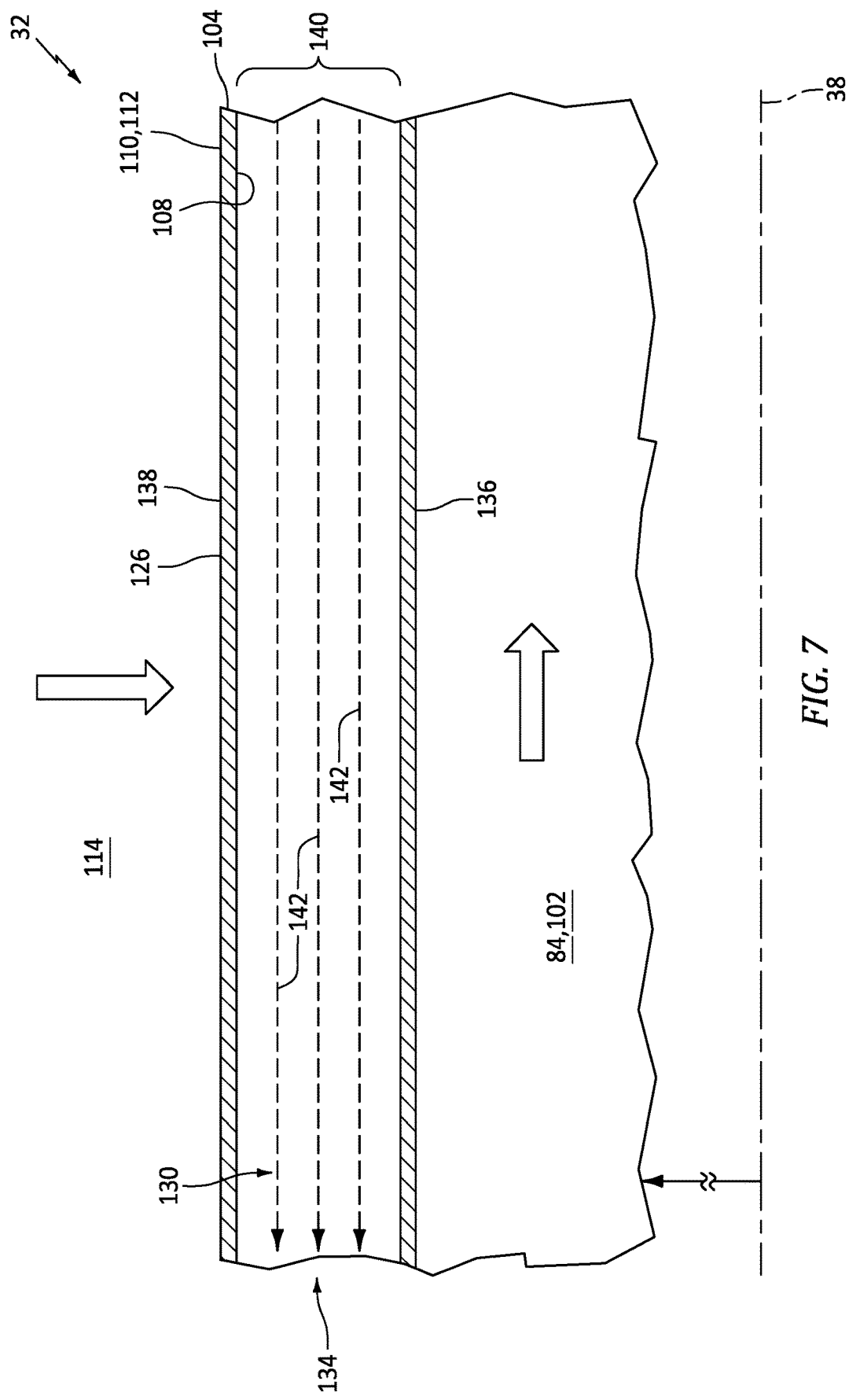
FIG. 7 is a sectional illustration of a portion of the tail boom with an integral heat exchanger.

Each heat exchanger 134 may be disposed within and attached to the boom sidewall 104. Alternatively, referring to FIG. 7, each heat exchanger 134 may be integrated as a part of the tail boom 32 and its boom sidewall 104. Each heat exchanger 134 of FIG. 7, for example, includes a heat exchanger inner wall 136, a heat exchanger outer wall 138 and a heat exchanger core 140. The inner wall 136 is radially between the core 140 and the air flowpath 84. The outer wall 138 is radially between the core 140 and the external environment 114. The outer wall 138 of FIG. 7, for example, is configured as a section of the boom sidewall 104. However, the outer wall 138 may alternatively be radially abutted against the boom sidewall 104. Referring again to FIG. 7, the core 140 is disposed radially between and is connected to (e.g., attached to or formed integral with) the inner wall 136 and the outer wall 138. This core 140 of FIG. 7 forms one or more (e.g., parallel) internal passages 142 within the respective heat exchanger 134, where these internal passages 142 form a respective section (e.g., a leg) of the coolant flowpath 130.

During cooling system operation, each heat exchanger 134 is operable to transfer the thermal energy received from the heat engine 54 (see FIG. 6) into (A) the system air flowing in the tail boom 32 and (B) the ambient air within the external environment 114 about the tail boom 32. For example, each heat exchanger 134 may transfer a portion of the heat energy in the heated coolant through the inner wall 136 into the system air. Each heat exchanger 134 may also transfer a portion of the heat energy in the heated coolant through the outer wall 138 into the ambient air. The heat exchangers 134 may thereby utilize two different air sinks to dump (e.g., waste) the excess heat energy generated by operation of the rotorcraft powerplant 44 and its heat engine 54.

Figure 8B:
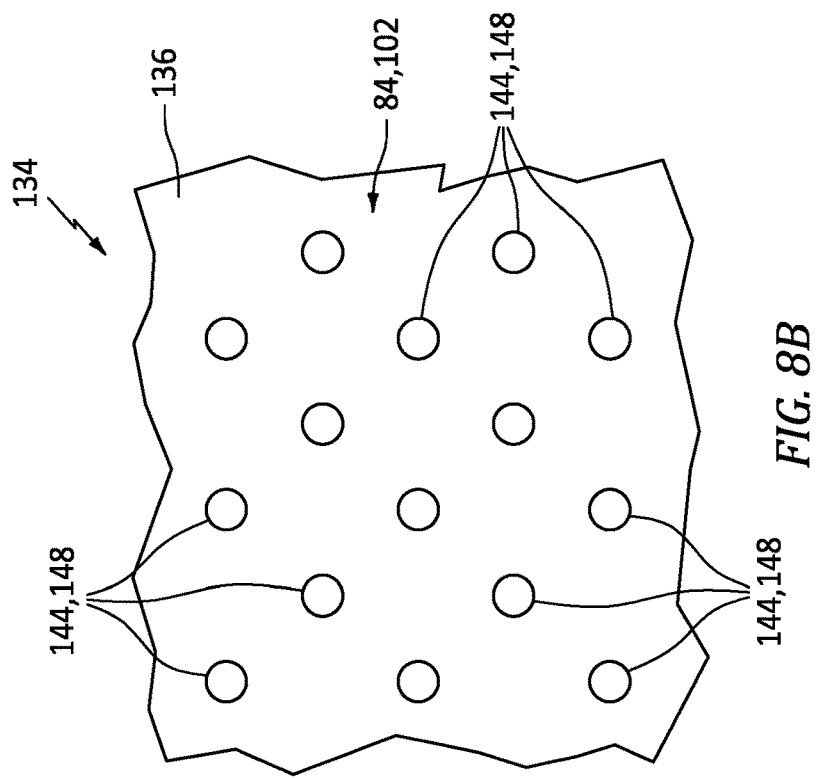
FIGS. 8A and 8B are partial illustrations of the heat exchanger with various types of cooling elements.
Figure 8A:
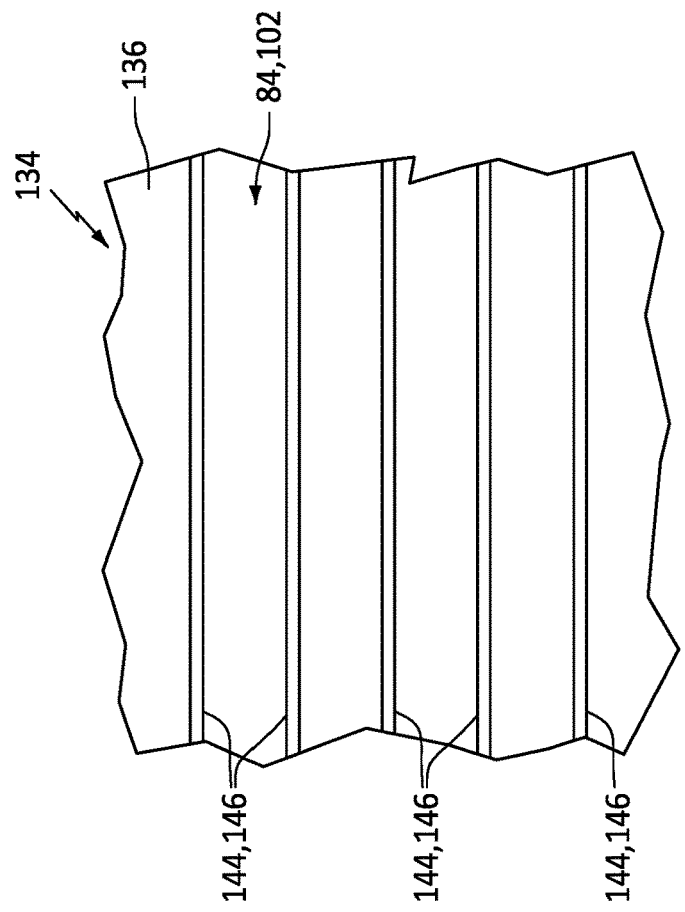

In some embodiments, referring to FIGS. 8A and 8B, each heat exchanger 134 may include one or more cooling elements 144. Each of these cooling elements 144 is connected to the inner wall 136, and projects (e.g., radially) from the inner wall 136 into the air flowpath 84. Each cooling element 144 is thereby configured to increase an available heat transfer area of the respective heat exchanger 134 along the air flowpath 84. Examples of the cooling elements 144 include, but are not limited to, longitudinally extending cooling fins 146 (e.g., see FIG. 8A) and cooling pedestals 148 (e.g., see FIG. 8B). By contrast, the outer wall 138 (e.g., see FIG. 7) may be configured without any cooling elements so as to maintain the aerodynamic exterior surface 112 of the tail boom 32.

Figure 9B:
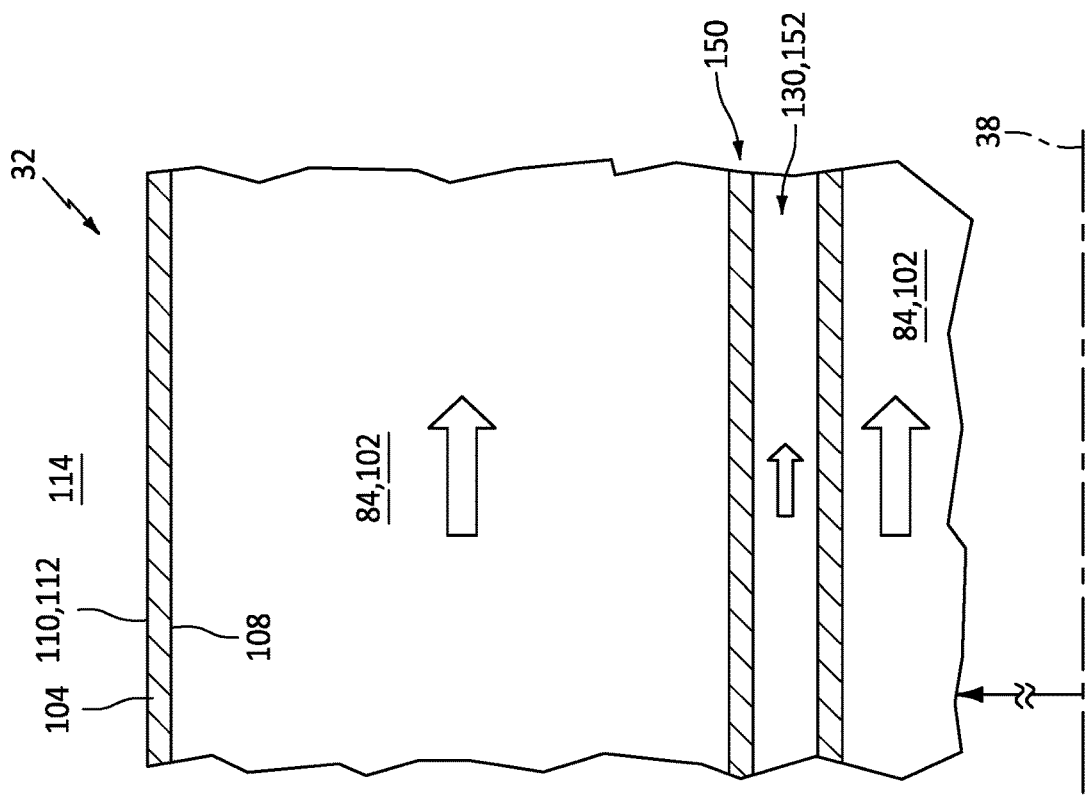
FIGS. 9A and 9B are sectional illustrations of the tail boom with various coolant conduit arrangements.
Figure 9A:
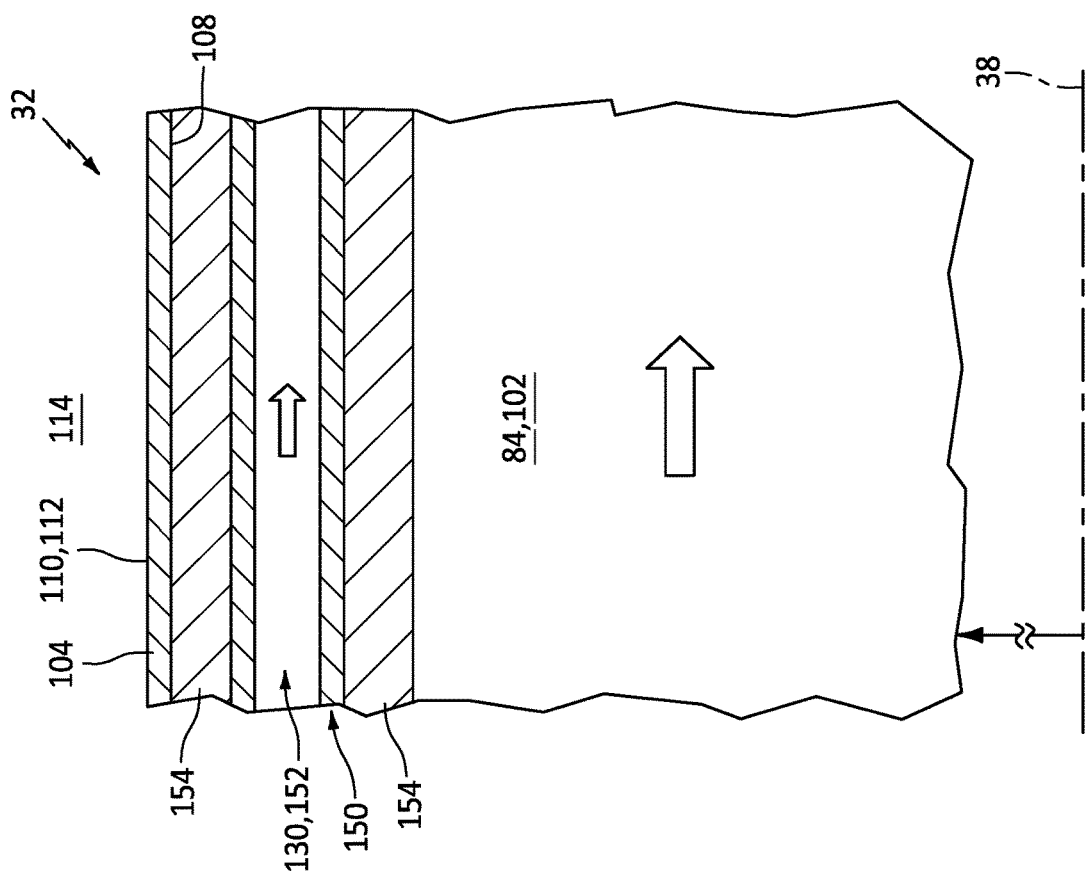

In some embodiments, referring to FIG. 9A, a conduit 150 forming a section 152 of the coolant flowpath 130 leading from the heat engine 54 to the heat exchangers 134 (see FIG. 6) may be insulated with insulation 154 (e.g., an insulation sleeve) and may be mounted to and/or otherwise extend along and next to the boom sidewall 104. Here, the conduit 150 is insulated to reduce potential of thermal distortion of the tail boom 32 and its boom sidewall 104. In other embodiments, referring to FIG. 9B, the conduit 150 may be run through a center region of the air flowpath 84. Here, the conduit 150 may be uninsulated. With such a configuration, the conduit 150 may also facilitate heat transfer between the heated coolant and the system air prior to reaching the heat exchangers 134 (see FIG. 6).

In some embodiments, referring to FIGS. 5A-D, the thruster axis 122 may be a horizontal axis. The thruster axis of FIGS. 5A-D, for example, may be parallel with (e.g., coaxial with) the centerline 38. In other embodiments, referring to FIGS. 10A-C, the thruster axis 122 may be a vertical axis; e.g., relative to gravity. The thruster axis of FIGS. 10A-C, for example, may be angularly offset from (e.g., perpendicular to) the centerline 38. In the thrust position of FIG. 10A, the variable tail thruster 90 positions the exhaust outlet 94 to the second lateral side 120 of the tail boom 32. Here, the variable tail thruster 90 provides lateral thrust. In the thrust position of FIG. 10C, the variable tail thruster 90 positions the exhaust outlet 94 to the boom tail end 40. Here, the variable tail thruster 90 provides longitudinal thrust; e.g., thrust in an aft direction. In the thrust position of FIG. 10B, the variable tail thruster 90 positions the exhaust outlet 94 in an intermediate position to provide some lateral thrust and some longitudinal thrust. The present disclosure, however, is not limited to the foregoing exemplary variable tail thruster configurations.

The rotorcraft powerplant 44 is described above as a turbo-compounded engine system with an intermittent combustion internal combustion engine. The rotorcraft powerplant 44 of the present disclosure, however, is not limited to such an exemplary configuration. It is contemplated, for example, the rotorcraft powerplant 44 may alternatively be configured as a continuous combustion internal combustion engine such as a gas turbine engine or the like. Moreover, while the rotorcraft powerplant 44 is described above as driving rotation of the rotorcraft rotor 42, it is contemplated the rotorcraft powerplant 44 and its heat engine 54 may also or alternatively power operation of another apparatus such as an electric generator.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a rotorcraft, comprising:
   a fuselage;
   a tail boom projecting longitudinally along a centerline out from the fuselage;
   an air system comprising an air flowpath, the air flowpath passing from the fuselage into the tail boom and extending longitudinally within the tail boom; and
   a cooling system including a first heat exchanger and a coolant flowpath extending through the first heat exchanger, the first heat exchanger arranged to extend longitudinally along the centerline with the tail boom, and the first heat exchanger configured to transfer heat energy between system air flowing in the air flowpath within the tail boom and coolant flowing in the coolant flowpath.

2. The assembly of claim 1, wherein the first heat exchanger includes
   a plurality of internal passages forming a section of the coolant flowpath within the first heat exchanger; and
   a plurality of cooling elements, each of the plurality of cooling elements projecting into the air flowpath within the tail boom.

3. The assembly of claim 1, wherein the first heat exchanger extends circumferentially about the air flowpath and the centerline.

4. The assembly of claim 1, wherein the first heat exchanger is disposed in the air flowpath within the tail boom.

5. The assembly of claim 1, wherein the first heat exchanger forms an outer peripheral side of the air flowpath within the tail boom.

6. The assembly of claim 1, wherein the first heat exchanger is configured to transfer additional heat energy between ambient air outside of the tail boom and the coolant flowing in the coolant flowpath.

7. The assembly of claim 1, wherein the first heat exchanger is integrated into a structure of the tail boom.

8. The assembly of claim 1, wherein
the tail boom comprises an exterior surface; and
the first heat exchanger forms a portion of the exterior surface.

9. The assembly of claim 1, wherein the air system is configured as an anti-torque system for the rotorcraft.

10. The assembly of claim 1, wherein the tail boom includes
a sidewall extending longitudinally along the centerline and circumferentially around the air flowpath; and
a slot extending longitudinally in the sidewall, the slot projecting through the sidewall to fluidly couple the air flowpath to an environment external to the tail boom.

11. The assembly of claim 1, wherein
the tail boom projects longitudinally along the centerline out from the fuselage to a distal tail end of the tail boom; and
the air flowpath extends longitudinally within the tail boom to an outlet located at the distal tail end of the tail boom.

12. The assembly of claim 11, wherein
the tail boom includes a variable tail thruster arranged at the distal tail end of the tail boom;
the variable tail thruster comprises the outlet and is rotatable about an axis.

13. The assembly of claim 1, wherein the tail boom is configured without a rotorcraft tail rotor.

14. The assembly of claim 1, further comprising:
a powerplant comprising a heat engine;
the cooling system configured to receive the heat energy from the heat engine, and the first heat exchanger configured to transfer the heat energy out of the coolant flowing in the coolant flowpath and into the system air flowing in the air flowpath.

15. The assembly of claim 14, further comprising:
a second heat exchanger arranged upstream of the first heat exchanger along the air flowpath;
the powerplant further comprising a powerplant flowpath extending through the second heat exchanger and the heat engine.

16. The assembly of claim 14, wherein the heat engine comprises a rotary engine.

17. An assembly for a rotorcraft, comprising:
a fuselage;
a tail boom projecting longitudinally along a centerline out from the fuselage;
a powerplant comprising a heat engine arranged in the fuselage; and
a cooling system including a first heat exchanger and a coolant flowpath, the first heat exchanger arranged to extend longitudinally along the centerline within the tail boom, and the coolant flowpath extending through the heat engine and the first heat exchanger.

18. The assembly of claim 17, further comprising:
an air system comprising an air flowpath;
the air flowpath passing from the fuselage into the tail boom and extending longitudinally within the tail boom; and
the first heat exchanger configured to transfer heat energy from liquid coolant flowing in the coolant flowpath into system air flowing in the air flowpath within the tail boom.

19. The assembly of claim 17, wherein the first heat exchanger is configured to transfer heat energy between ambient air outside of the tail boom and liquid coolant flowing in the coolant flowpath.

20. A rotorcraft configured without a tail rotor, the rotorcraft comprising:
a fuselage;
a tail boom connected to and projecting longitudinally along a centerline out from the fuselage;
a rotorcraft rotor above the fuselage;
a powerplant configured to drive rotation of the rotorcraft rotor, the powerplant comprising a heat engine within the fuselage; and
a heat exchange system for the powerplant, the heat exchange system comprising a heat exchanger arranged to extend longitudinally along the centerline within the tail boom.

* * * * *